United States Patent
Maeda et al.

(10) Patent No.: US 7,290,630 B2
(45) Date of Patent: Nov. 6, 2007

(54) VEHICLE FRONT END STRUCTURE

(75) Inventors: Akihiro Maeda, Kariya (JP); Yuhei Kunikata, Kariya (JP); Toshiki Sugiyama, Kariya (JP)

(73) Assignee: DENSO Corporation, Kariya (JP)

(*) Notice: Subject to any disclaimer, the term of this patent is extended or adjusted under 35 U.S.C. 154(b) by 303 days.

(21) Appl. No.: 10/897,369

(22) Filed: Jul. 22, 2004

(65) Prior Publication Data

US 2005/0023057 A1 Feb. 3, 2005

(30) Foreign Application Priority Data

Jul. 24, 2003 (JP) .............................. 2003-279175
Mar. 12, 2004 (JP) .............................. 2004-070610

(51) Int. Cl.
*B60K 11/08* (2006.01)
(52) U.S. Cl. .................... 180/68.4; 180/69.2; 180/68.2
(58) Field of Classification Search ............... 180/68.4, 180/68.6, 69.2, 68.1, 68.2
See application file for complete search history.

(56) References Cited

U.S. PATENT DOCUMENTS

| | | | | |
|---|---|---|---|---|
| 3,933,136 | A | * | 1/1976 | Burst ..................... 123/41.58 |
| 4,566,407 | A | * | 1/1986 | Peter ..................... 123/41.48 |
| 4,938,303 | A | * | 7/1990 | Schaal et al. ............... 180/68.1 |
| 5,046,550 | A | * | 9/1991 | Boll et al. .................... 165/41 |
| 5,205,484 | A | * | 4/1993 | Susa et al. .................. 236/35.3 |
| 5,476,138 | A | * | 12/1995 | Iwasaki et al. ................ 165/41 |
| 5,490,572 | A | * | 2/1996 | Tajiri et al. .................. 180/65.1 |
| 5,901,786 | A | * | 5/1999 | Patel et al. ................... 165/283 |
| 6,302,223 | B1 | * | 10/2001 | Cottereau et al. ............ 180/68.1 |
| 6,390,217 | B1 | * | 5/2002 | O'Brien et al. ............. 180/68.6 |
| 6,543,525 | B2 | * | 4/2003 | Kalbacher ................... 165/140 |
| 6,626,483 | B2 | * | 9/2003 | Ozawa et al. ........... 296/193.09 |
| 6,708,790 | B2 | * | 3/2004 | Ozawa et al. ............... 180/68.4 |
| 7,114,587 | B2 | * | 10/2006 | Mori et al. ................. 180/68.3 |

FOREIGN PATENT DOCUMENTS

| | | |
|---|---|---|
| JP | 5-24424 | 3/1993 |
| JP | 7-165114 | 6/1995 |
| JP | 7-228161 | 8/1995 |
| JP | 7-285347 | 10/1995 |
| JP | 2001-80370 | 3/2001 |

* cited by examiner

*Primary Examiner*—Christopher P. Ellis
*Assistant Examiner*—Brian Swenson
(74) *Attorney, Agent, or Firm*—Harness, Dickey & Pierce, PLC

(57) ABSTRACT

In a front end structure of a vehicle, a heat exchanger is arranged at a position lower than a bumper reinforcement member, so a position of an engine hood is lowered. Electric auxiliary devices such as a radar, electronic control units for lights, and an air cleaner are arranged at a position higher than the bumper reinforcement member or at the rear of the bumper reinforcement member. By this arrangement, the electric auxiliary devices are arranged at a position which is less likely to be affected by the bumper reinforcement member in a case of light frontal crush.

10 Claims, 13 Drawing Sheets

VEHICLE FRONT END STRUCTURE

CROSS REFERENCE TO RELATED APPLICATION

This application is based on Japanese Patent Applications No. 2003-279175 filed on Jul. 24, 2003 and No. 2004-70610 filed on March 12, 2004, the disclosure of which are incorporated herein by reference.

FIELD OF THE INVENTION

The present invention relates to a vehicle front end structure including heat exchangers, a bumper reinforcement member and the like.

BACKGROUND OF THE INVENTION

As shown in FIG. 16, a bumper reinforcement member 2 is generally provided at the front end of a vehicle at a predetermined height. The bumper reinforcement member 2 is in a form of beam and extends in a vehicle left and right direction. Heat exchangers 1, 3, such as a radiator and a condenser, are provided at the rear of the bumper reinforcement member 2. Further, air intake openings 21, 22 are formed above and under the bumper reinforcement member 2 to introduce cooling air toward upper side and lower side of core portions of the heat exchangers 1, 3.

In this arrangement, the air is heated while passing through the core portions of the heat exchangers 1, 3. Therefore, auxiliary devices mounted in an engine compartment are cooled by the heated air having passed through the heat exchangers 1, 3. As a result, the temperature difference between the auxiliary devices and the air is reduced. Therefore, it is difficult to effectively cool the auxiliary devices.

Some of the auxiliary devices such as a radar 6 are generally arranged upstream of the heat exchangers 1, 3 with respect to a flow of air, that is, in front of the heat exchangers 1, 3. Thus, such auxiliary devices are cooled by the air before passing through the heat exchangers 1, 3. In a case of a frontal crush, however, the auxiliary devices arranged in front of the heat exchangers 1, 3 will be directly affected by a colliding object x, as shown in FIG. 7.

The bumper reinforcement member 2 is located at the substantially middle position of the core portion of the heat exchangers 1, 3 with respect to a vertical direction, in front of the heat exchangers 1, 3. In the case of frontal crush, crushable boxes 100, which are provided at the right and left ends of the bumper reinforcement member 2, will be deformed. Further, the bumper reinforcement member 2 will be deformed or moved toward the rear position of the vehicle. As a result, the bumper reinforcement member 2 causes damage to the core portions of the heat exchangers 1, 3.

SUMMARY OF THE INVENTION

The present invention is made in view of the foregoing matters, and it is an object of the present invention to provide a vehicle front end structure, capable of improving cooling efficiency of auxiliary devices and reducing damage to the auxiliary devices and heat exchangers when a vehicle collides at a front side.

It is another object of the present invention to provide a vehicle front end structure having an improved designing flexibility around an engine hood.

It is further another object of the present invention to provide a vehicle front end structure in which heat radiating performance of heat exchangers is maintained even within a limited arrangement space.

According to a first aspect of the present invention, a front end structure of a vehicle includes a bumper reinforcement member, an air intake part and a heat exchanger. The bumper reinforcement member is in a form of beam and disposed at a front end of the vehicle to extend in a vehicle left and right direction. The air intake part defines an opening under the bumper reinforcement member. The heat exchanger has a core portion for performing heat exchange by receiving air introduced from the opening. The heat exchanger is disposed at a rear of the bumper reinforcement member with respect to a vehicle front and rear direction such that a top end of the core portion is located at a position lower than a top end of the bumper reinforcement member. Further, the heat exchanger is arranged in an inclined position such that a top end of the heat exchanger is located more to a rear side of the vehicle than a bottom end of the heat exchanger.

Accordingly, since the heat exchanger is arranged such that the top end of the core portion is lower than the top end of the bumper reinforcement member, an arrangement position of the heat exchanger is lowered, in comparison to a conventional position. Therefore, a space for mounting an auxiliary device is easily made above the heat exchanger. Since the arrangement position of the heat exchanger is lowered, a designing flexibility around an engine hood is improved. Therefore, it is easy to design slant-nosed engine hood, for example. In addition, because the center of gravity of the vehicle is lowered, traveling stability of the vehicle is improved.

Furthermore, since the heat exchanger is arranged in the inclined position, the air having high flow velocity distribution is supplied to a wide area of the core portion. Although the arrangement position of the heat exchanger is limited to the position lower than the top end of the bumper reinforcement member, heat radiating performance of the heat exchanger is maintained. In addition, a distance between the bumper reinforcement member and the top end of the heat exchanger is increased. Therefore, damage to the heat exchanger is reduced, in a case of a frontal crush of the vehicle. Since the heat exchanger is inclined toward the rear position of the vehicle, a mounting space of the heat exchanger with respect to the vehicle front and rear direction is increased. However, since the heat exchanger is arranged at a lower position, the increase of the mounting space does not cause a problem.

According to a second aspect of the present invention, a front end structure of a vehicle includes a bumper reinforcement member in a form of beam, a first air intake part defining a first opening above the bumper reinforcement member, a second air intake part defining a second opening under the bumper reinforcement member, a heat exchanger, and an auxiliary device. The heat exchanger has a core portion for performing heat exchange by receiving air introduced from the second opening. The heat exchanger is arranged such that a top end of the core portion is located at a position lower than a top end of the bumper reinforcement member. Further, the auxiliary device is disposed in an air passage through which air introduced from the first opening flows while bypassing the heat exchanger.

Accordingly, since the arrangement position of the heat exchanger is lowered, designing flexibility around the engine hold is improved. Further, since the center of gravity of the vehicle is lowered, the traveling stability is improved. In addition, the auxiliary device is cooled by low temperature air bypassing the heat exchanger. Therefore, the auxiliary device is effectively cooled.

According to a third aspect of the present invention, a front end structure of a vehicle includes a bumper reinforcement member in a form of beam, an air intake part, a heat exchanger, a blower unit, an auxiliary device, and a duct member. The air intake port defines an opening under the bumper reinforcement member. The heat exchanger is arranged such that a top end of a core portion is lower than a top end of the bumper reinforcement member, at a rear of the bumper reinforcement member with respect to a vehicle front and rear direction. The blower unit is arranged at a rear of the heat exchanger and causes air, which has been introduced from the opening, to pass through the core portion. The duct member defines an air passage and a downstream end of the duct member communicates with an inlet of the blower unit. The auxiliary device is arranged in the duct member to be cooled by air passing through the duct member.

Since the arrangement position of the heat exchanger is lowered, the designing flexibility of the engine hood is improved. Also, the traveling stability of the vehicle is promoted. Furthermore, since the auxiliary device is forcibly cooled by the air flow created by the blower unit, cooling effect of the auxiliary device is improved.

According to a fourth aspect of the present invention, a front end structure of a vehicle has a bumper reinforcement member in a form of beam, an air intake part, and a heat exchanger. The air intake part defines an opening under the bumper reinforcement member for introducing air. The heat exchanger has a core portion for performing heat exchange by receiving air introduced from the opening. The heat exchanger is arranged such that a top end of a core portion is located at a position lower than a top end of the bumper reinforcement member, at a rear of the bumper reinforcement member. Further, the core portion is constructed such that a temperature efficiency is equal to or greater than 0.83.

In addition to the improvement of the design flexibility and the traveling stability, heat radiation is efficiently performed. Although the arrangement position of the core portion is limited to the position lower than the top end of the bumper reinforcement member, heat radiating performance of the heat exchanger is ensured. For example, the heat exchanger is a radiator performing heat exchange between the air and an engine cooling water for cooling an engine of the vehicle.

According to a fifth aspect of the present invention, a front end structure of a vehicle includes a bumper reinforcement member in a form of beam, a heat exchanger arranged at a rear of the bumper reinforcement member, an auxiliary device disposed in an air passage through which air flows while bypassing the heat exchanger, and a front end panel. The heat exchanger is arranged such that a top end of the heat exchanger is located at a position lower than a bottom end of the bumper reinforcement member. The heat exchanger and the auxiliary device are integrated with the front end panel into a module. The front end pan el is fixed to a body of the vehicle. Furthermore, the front end panel forms a bumper reinforcement member receiving portion in a form of recess on its front face at a position opposite to the bumper reinforcement member.

Accordingly, since the heat exchanger is arranged lower than the bumper reinforcement member, the center of the gravity of the vehicle is lowered. In addition, it is less likely that the heat exchanger will be damaged by the bumper reinforcement member, even if the bumper reinforcement member is deformed toward the rear side in a case of a frontal crush. Because the bumper reinforcement member will enter the bumper reinforcement member receiving portion, the bumper reinforcement member will not directly strike the front end panel. Therefore, damage to the front end panel is reduced.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
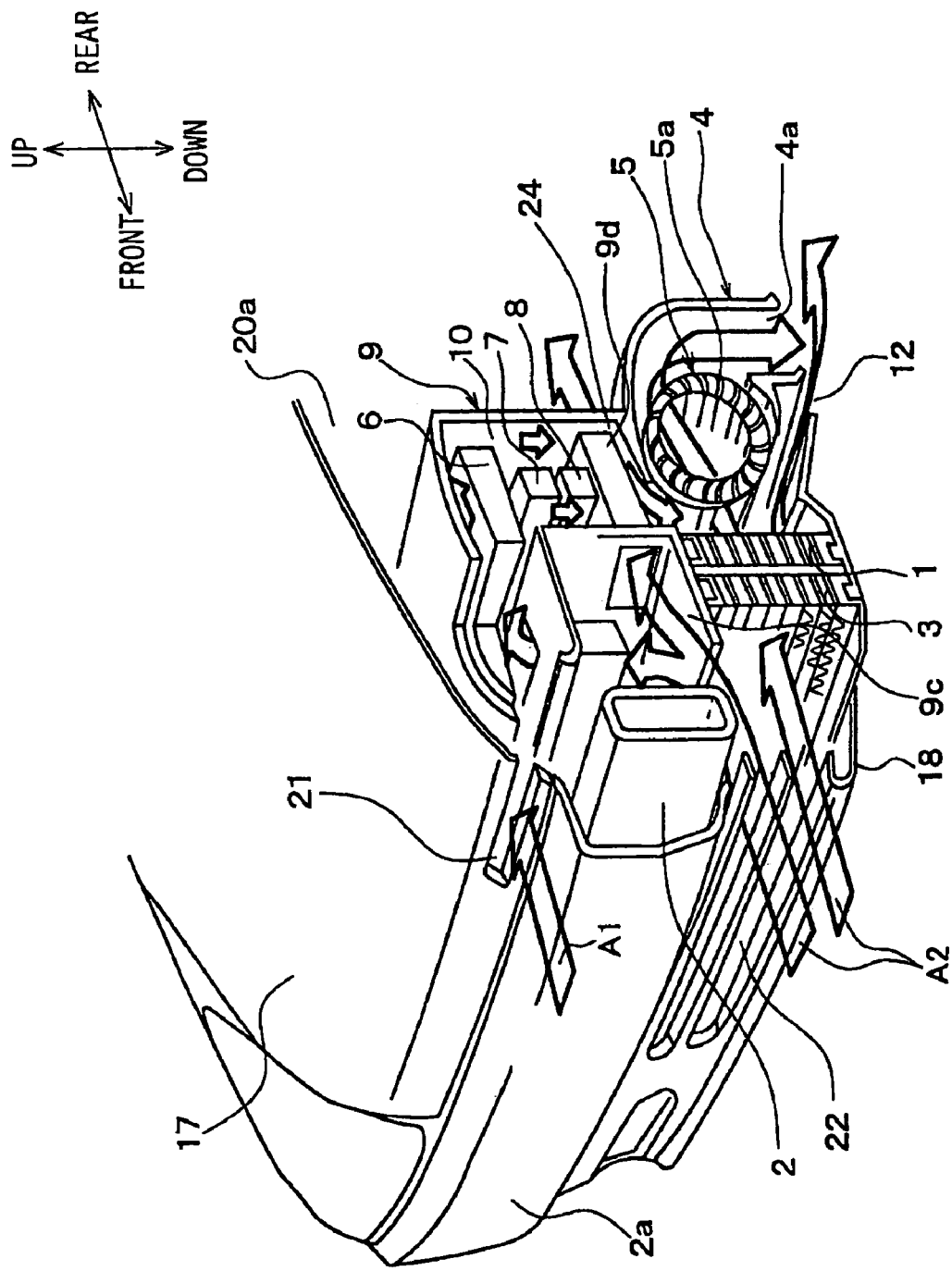
FIG. 1 is a perspective view of a vehicle front end, partly including a cutaway view, according to a first embodiment of the present invention.

Embodiments of the present invention will be described hereinafter with reference to the drawing.

First Embodiment

Figure 2:
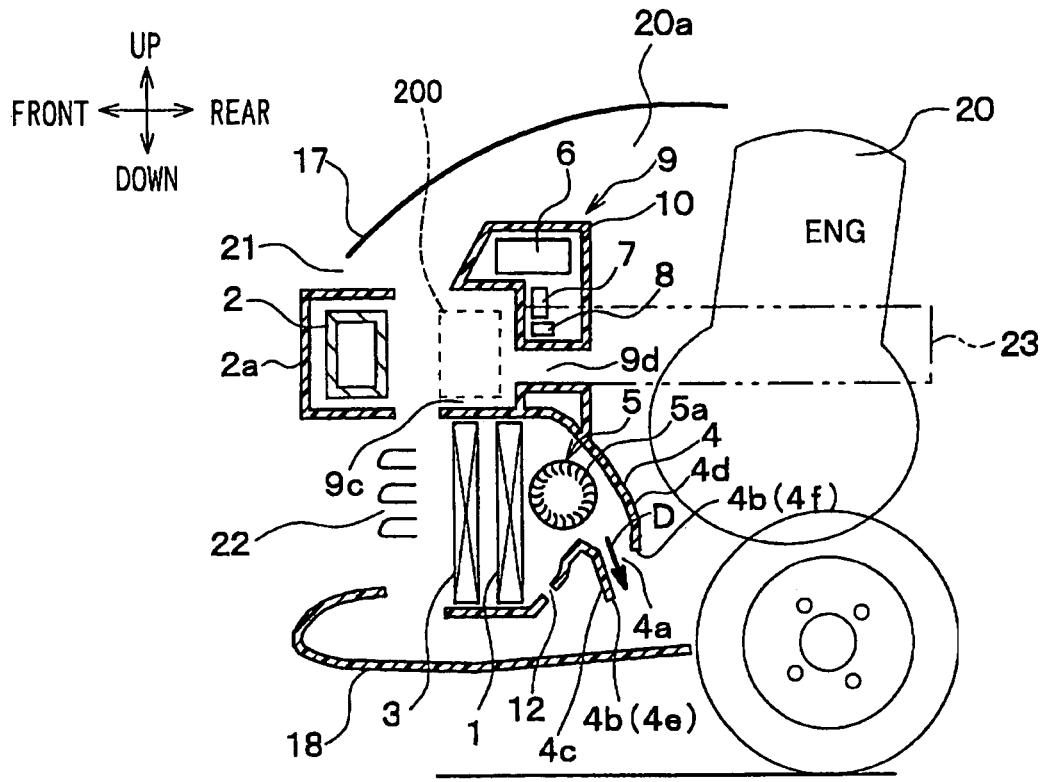
FIG. 2 is a cross-sectional view of the vehicle front end according to the first embodiment of the present invention.
Figure 3:
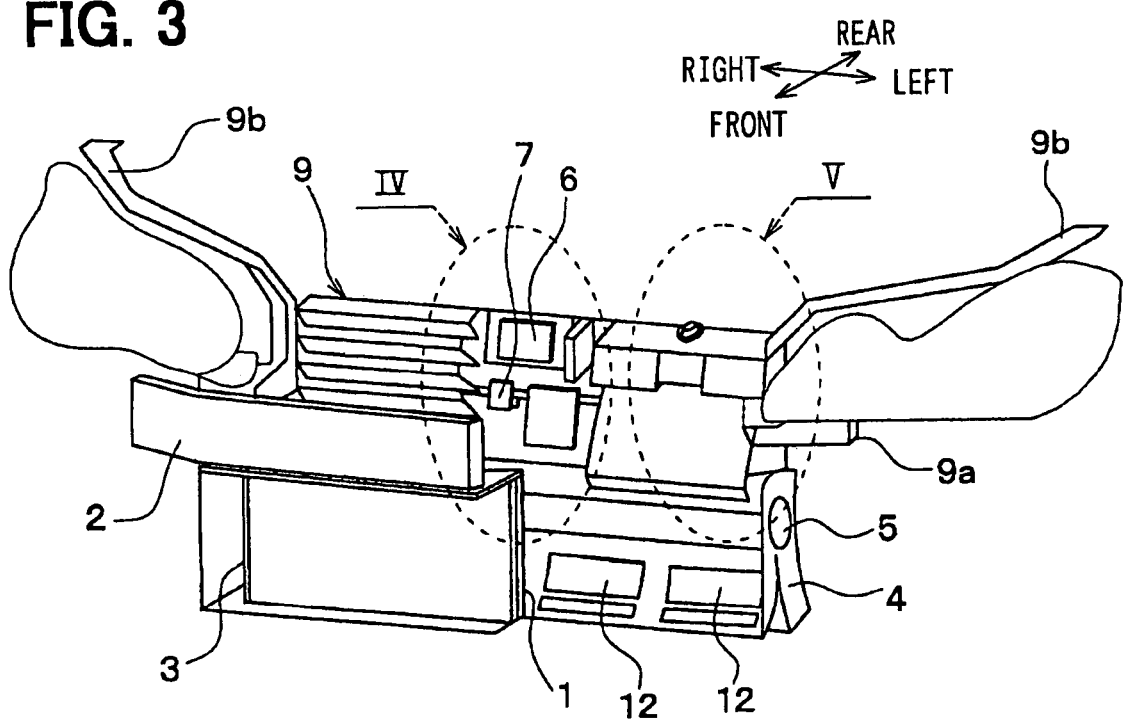
FIG. 3 is a schematic perspective view of a front end module of the vehicle front end structure according to the first embodiment of the present invention.

FIGS. 1 and 2 show a front end structure of a vehicle of the embodiment. FIG. 3 shows a schematic perspective view of a front end module in which a front end panel 9, heat exchangers 1, 3 for radiating heat and vehicle auxiliary devices are integrated, when viewed from a front side. In FIGS. 1 to 3, a front and rear arrow, an up and down arrow and a left and right arrow denote arrangement directions in the front end structure with respect to the vehicle.

Referring to FIGS. 1 to 5, the heat exchanger 1 is a radiator performing heat exchange between air (outside air) and an engine cooling water, thereby to cool the engine cooling water. The engine cooling water cools an engine (internal combustion engine) 20, which produces a driving power source of the vehicle.

In the embodiment, the radiator 1 has a width with respect to a vehicle left and right direction (width direction) larger than a height with respect to an up and down direction. That is, the radiator 1 is a flat shape and long from side to side. Therefore, the radiator 1 can provide a required heat radiating efficiency. Also, the radiator 1 is mounted at a position lower than a bumper reinforcement member 2 in the vehicle when viewed from a vehicle front side. That is, a top end of the radiator 1 is lower than a bottom end of the bumper reinforcement member 2.

The bumper reinforcement member 2 is generally mounted at a front end of the vehicle, that is, on a front side of an engine compartment 20a in which the engine 20 is mounted. The bumper reinforcement member 2 is in a form of beam extending in the vehicle left and right direction. The bumper reinforcement member 2 is provided to absorb the impact of a shock from the vehicle front side. In general, the bumper reinforcement member 2 is made of metal and has a rectangular-shaped cross-section. The left and right ends of the bumper reinforcement member 2 are connected to side members 23 (FIG. 2) provided on a vehicle body through stress absorbing members (not shown). The stress absorbing member is generally referred to as a crushable box and is easily deformable by the impact of the shock when the vehicle collides.

A resinous bumper cover 2a is arranged in front of the bumper reinforcement member 2 as a design member. The bumper cover 2a covers a front face of the bumper reinforcement member 2.

The top of the engine compartment 20a in which the engine 20, the radiator 1 and the like are installed, is covered with an engine hood (bonnet) 17. The bottom of the engine compartment 20a is generally covered with an under cover 18. Openings are formed in the under cover 18 at necessary positions for purposes such as for discharging air.

The heat exchanger 3 is a condenser. The condenser 3 is provided to cool a high pressure refrigerant discharged from a compressor of a vapor compression refrigerant cycle apparatus constructing a vehicle air conditioning apparatus. The condenser 3 radiates heat, which is absorbed from air to be blown into a passenger compartment in an evaporator (not shown), to the outside of the passenger compartment. Similar to the radiator 1, the condenser 3 is flat and long from side to side. The condenser 3 is arranged in front of the radiator 1. That is, the condenser 3 is arranged upstream of the radiator 1 with respect to an air flow. Also, the condenser 3 is situated at a position lower than the bumper reinforcement member 2. That is, a top end of the condenser 3 is lower than the bottom end of the bumper reinforcement member 2.

At the front end of the vehicle, a first air intake part (first opening) 21 and a second air intake part (second opening) 22 are formed above and under the bumper reinforcement member 2, respectively. The first air intake part 21 is formed to introduce or draw air for cooling various auxiliary devices in the engine compartment 20a. The second air intake part 22 is formed to introduce air to be supplied to the heat exchangers including the radiator 1 and the condenser 3. Here, the air introduced from the second air intake part 22 is partly used for cooling some of the auxiliary devices.

The second air intake part 22 is located in front of the radiator 1 and the condenser 3 and opposed to the condenser 3.

A vertical dimension (height) of the second air intake part 22 with respect to the vertical direction is substantially the same as the vertical dimension (height) of the radiator 1 and the condenser 3.

The amount of air required to be introduced from the first air intake 21 is smaller than that of the second air intake part 22. Thus, a vertical dimension (height) of the first air intake part 21 is smaller than that of the second air intake part 22. In an example shown in FIG. 1., the first air intake part 21 is provided of a single opening in a form of such as slit extending in the vehicle left and right direction and having a small vertical dimension. In the embodiment, the first air intake part 21 is formed at a front end of the engine hood 17. Alternatively, the first air intake part 21 can be formed at an upper end of the bumper cover 2a.

Further, the second air intake part 22 is formed under the bumper cover 2a. The second air intake part 22 is formed of a plurality of openings in the form of lattice.

The radiator 1 and the condenser 3 are arranged at a front end of a first air duct 4. The first air duct 4 extends to a rear side of the vehicle. That is, the radiator 1 and the condenser 3 are arranged at an upstream end of the first air duct 4 with respect to the air flow. The first air duct 4 is made of a resin material.

Specifically, the first air duct 4 diagonally downwardly extends toward the rear side of the vehicle, at the rear of the radiator 1. The first air duct 4 forms an air discharge port 4a at its lower end. The air passed through the radiator 1 is discharged to the outside from the air discharge port 4a. Namely, the first air duct 4 provides an air discharge duct.

The air discharge port 4a is open at a lower position of the engine compartment 20a, as shown in FIG. 3. The air discharge port 4a is in a form of substantially rectangular shape extending substantially from the left end to the right end of the vehicle. The under cover 18 forms the opening at a position opposing to the air discharge port 4a. Thus, the air discharged from the air discharge port 4a is discharged under the under cover 18.

A front wall 4c and a rear wall 4d of the first air duct 4 that connect to an outer perimeter 4b of the air discharge port 4b extend in the vehicle left and right direction. Further, the front side of the outer perimeter 4b of the air discharge port 4b is lower than the rear side of the outer perimeter 4b. That is, the lower end of the front wall 4c is lower than the lower end of the rear wall 4d. Therefore, an opening direction of the air discharge port 4a is inclined to a rear side of the vehicle with respect to a vertical direction. Here, the opening direction of the air discharge port 4a means a direction parallel to a normal of a plane surface or a curved surface in which the perimeter 4b is contained, so the air is discharged along the opening direction of the air discharge port 4a, as shown by an arrow D in FIG. 2.

Here, the front wall 4c and the rear wall 4d are offset from each other in the up and down direction. The lower end 4e of the front wall 4c is lower than the lower end 4f of the rear wall 4d.

Further, a blower unit 5 is provided downstream of the radiator 3 in the first air duct 4. The blower unit 5 causes air to pass through the radiator 1 and the condenser 3. The blower unit 5 has a transverse fan 5a (see, JIS B 0132 No. 1017, for example) in which air is discharged in a direction perpendicular to an axis of a bladed wheel having multiple blades. The transverse fan 5a is generally referred to as a cross flow fan. The transverse fan 5a is arranged in the first air duct 4 such that its rotation axis (not shown), is parallel to the vehicle left and right direction. The rotation axis of the transverse fan 5a is connected to a motor (not shown), so the transverse fan 5a is rotated by the motor.

Figure 4:
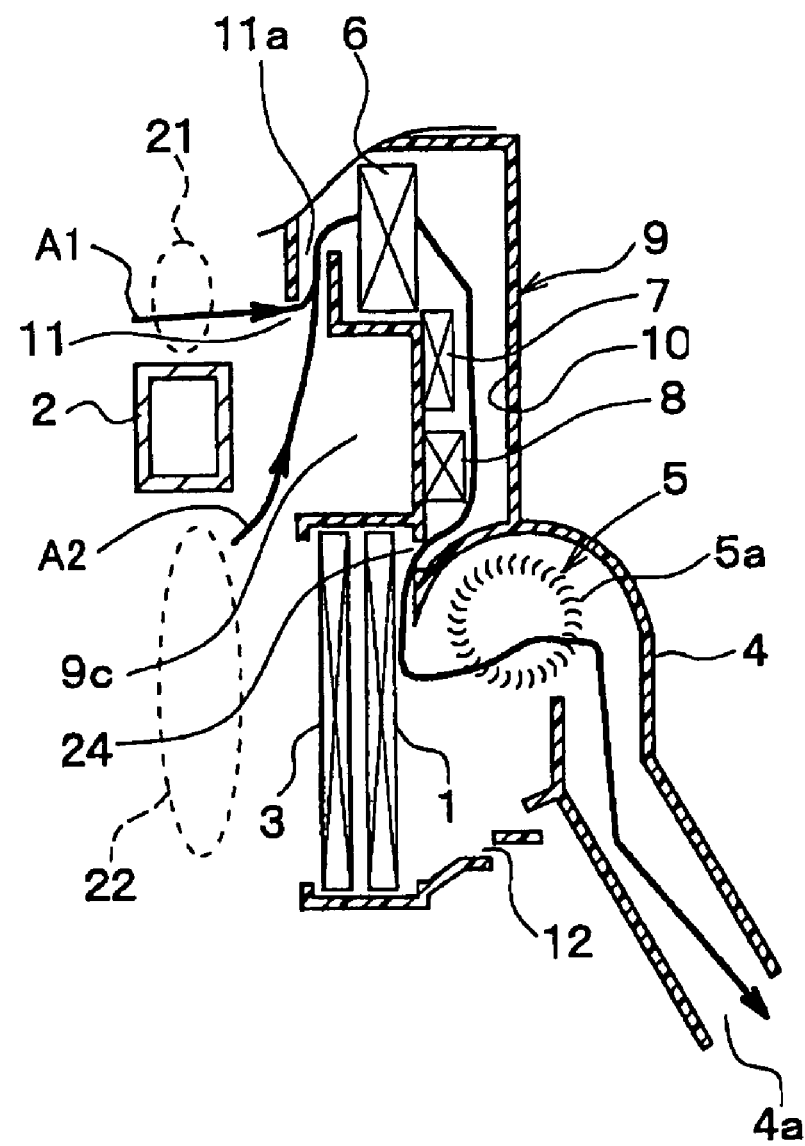
FIG. 4 is a cross-sectional view of a section IV of the vehicle front end shown in FIG. 3.

As shown in FIG. 4, the electric auxiliary devices such as a radio wave radar 6, a first electronic control unit 7, and a second electronic control unit 8 are arranged at a position higher than the radiator 1 and the condenser 3. Specifically, the radar 6 detects a distance from an obstacle in front of the vehicle such as a forward vehicle by using radio wave. The radar 6 is located at a position higher than the bumper reinforcement member 2 when viewed from the vehicle front side. The first electronic control unit 7 is provided to control lighting system such as headlamp. The second electronic control unit 8 is provided to control the blower unit 5. The electronic control units 7, 8 are arranged at the rear of the bumper reinforcement member 2.

The heat exchangers including the radiator 1 and the condenser 3, and the electric auxiliary devices including the radar 6 and the electronic control units 7, 8 are integrated with a front end panel 9. Other devices such as an air cleaner 16 are also integrated with the front end panel. Thus, the front end panel 9 constructs a front module (integrally assembled structure body) with the above front devices.

Therefore, the front devices including the heat exchangers 1, 3 and the auxiliary devices 6, 7, 8 16 are mounted to the vehicle body through the front end panel 9. The front end panel 9 is fixed to the vehicle body at the vehicle front end. Because the front end panel 9 supports the radiator 1 and the other devices, it is also referred to as a carrier or a radiator support.

In the embodiment, the front end panel 9 is made of a resin material, a tensile strength of which is increased by including such as carbon fiber or glass fiber. The first air duct 4, a second air duct 19 and holding portions for holding the above devices are integrally formed into the front end panel 9.

As shown in FIG. 3, the front end panel 9 is formed with first fixing portions 9a and second fixing portions 9b that protrudes in the vehicle left and right direction. In FIG. 3, although a left first fixing portion 9a is illustrated, a right first fixing portion 9a is not illustrated.

The right and left first fixing portions 9a are fixed to the side members 23 of the vehicle body, and the right and left second fixing portions 9b are fixed to side apron panel (not shown). Thus, the front end panel 9 is mounted to the vehicle body.

As shown in FIG. 4, a first cooling air intake passage 11 is formed on an upper side of the front end panel 9 and at a substantially middle position with respect to the left and right direction. The first cooling air intake passage 11 is provided to supply the cooling air for the electric auxiliary devices such as the radar 6 and the electronic control units 7, 8. The outside air passed through the first air intake part 21 (arrow A1 in FIG. 1) is introduced into the first cooling air passage 11. Also, the air passed through the second air intake part 22 (arrow A2 in FIG. 1) is partly introduced into the first cooling air passage 11.

Further, a labyrinthine structure portion 11a is formed in the first cooling air passage 11. The labyrinthine structure portion 11a forms a serpentine air path. So, the air flow is serpentine in the vertical direction. Rainwater, which may be contained in the air, is separated from the air while passing through the labyrinthine structure portion 11a. Accordingly, it is less likely that the electric auxiliary devices such as the electronic control unit 7 will be affected by the rainwater.

In the front end panel 9, a second air duct 10 is formed at a position downstream of the labyrinthine structure portion 11a with respect to a flow of the cooling air. The electric auxiliary devices 6, 7, 8 are arranged in the second air duct 10 to be cooled by the cooling air passing therethrough.

The second air duct 10 is provided to further introduce the cooling air passed through the auxiliary devices 6, 7, 8 to an upstream portion of the blower unit 5, that is, to a suction side of the blower unit 5. Specifically, a downstream end of the second air duct 10 is communicated with the suction side of the blower 5 through a communication hole 24, as shown in FIG. 4.

On the other hand, a communication hole 12 is formed on the first air duct 4 at a position upstream of the blower unit 5 with respect to the flow of cooling air, as shown in FIG. 4. The communication hole allows the inside of the first air duct 4 to communicate with the outside. In an example shown in FIG. 4, the communication hole is formed on a bottom wall of the first air duct 4 upstream of the blower 5.

Further, a switch valve (not shown) is provided at the communication hole 12. When an air pressure (ram pressure) equal to or greater than a predetermined level is applied in the first air duct 4, that is, when a vehicle speed is equal to or greater than a predetermined speed, the switch valve opens to expose the communication hole 12. While the blower 5 is operated, the switch valve is closed to cover the communication hole 12.

Further, a second cooling air intake passage 13 is formed on an upper front portion of the front end panel 9. The second cooling air intake passage 13 is offset from the first cooling air intake passage 11 with respect to the vehicle left and right direction. The first cooling air intake passage 11 is located at the substantially middle position with respect to the vehicle left and right direction. In the embodiment, the second cooling air intake passage 13 is located on the left side of the first cooling air intake passage 11. The second cooling air intake passage 13 is provided to introduce the outside air passed through the first air intake part 21 toward the engine 20 as an engine intake air.

Similar to the labyrinthine structure portion 11a of the first cooling air intake passage 11, a labyrinthine structure portion 13a is formed in the second cooling air intake passage 13. The air path is serpentine with respect to the up and down direction in the labyrinthine structure portion 13a. The labyrinthine structure portion 13a restricts rainwater from entering the engine 20 with the engine intake air. Therefore, the labyrinthine structure portions 11a, 13a provides water restricting means.

An inside air intake port 14 is formed on an upper side of the front end panel 9 and at the rear of the second cooling air intake passage 13. The inside air intake port 14 is provided to draw the air (warm air, arrow A3, in FIG. 5) inside the engine compartment 20a as the engine intake air. Further, an inside and outside air switching door 15 is provided in the front end panel 9 at a position adjacent to the inside air intake port 14. The inside and outside air switching door 15 is provided to switch an air intake mode between an outside air intake mode and an inside air intake mode. In the outside air intake mode, the outside air (cool air, arrow A4, in FIG. 5) sucked from the second cooling air intake passage 13, is supplied to the engine 20 as the intake air. In the inside air intake mode, the inside air (warm air) sucked from the inside air intake port 14 is supplied to the engine 20 as the intake air.

In the embodiment, the inside and outside air switching door 15 is switched such that the inside air intake mode is selected when temperature of the engine 20 is low and in an engine start up, and the outside air intake mode is selected when the temperature of the engine 20 is high and an engine load is high. Specifically, a vacuum actuator 15a, which is operated by using negative pressure of the engine intake air, is employed as a driving means of the inside and outside air switching door 15. The volume of negative pressure of the engine intake air supplied to the negative pressure actuator 15 is controlled according to the operation condition of the engine 20, thereby operating the inside and outside air switching door 15.

The air cleaner 16 is arranged in the front end panel 9, at a position downstream of the inside and outside air switching door 15 with respect to the flow of intake air, that is, under the inside and outside air switching door 15, and at the rear of the bumper reinforcement member 2. The air cleaner 16 is provided to remove dusts from the engine intake air. Similar to the electric auxiliary devices 6, 7, 8, the air cleaner 16 and the inside and outside air switching door 15 are integrally mounted to the front end panel 9.

Figure 5:
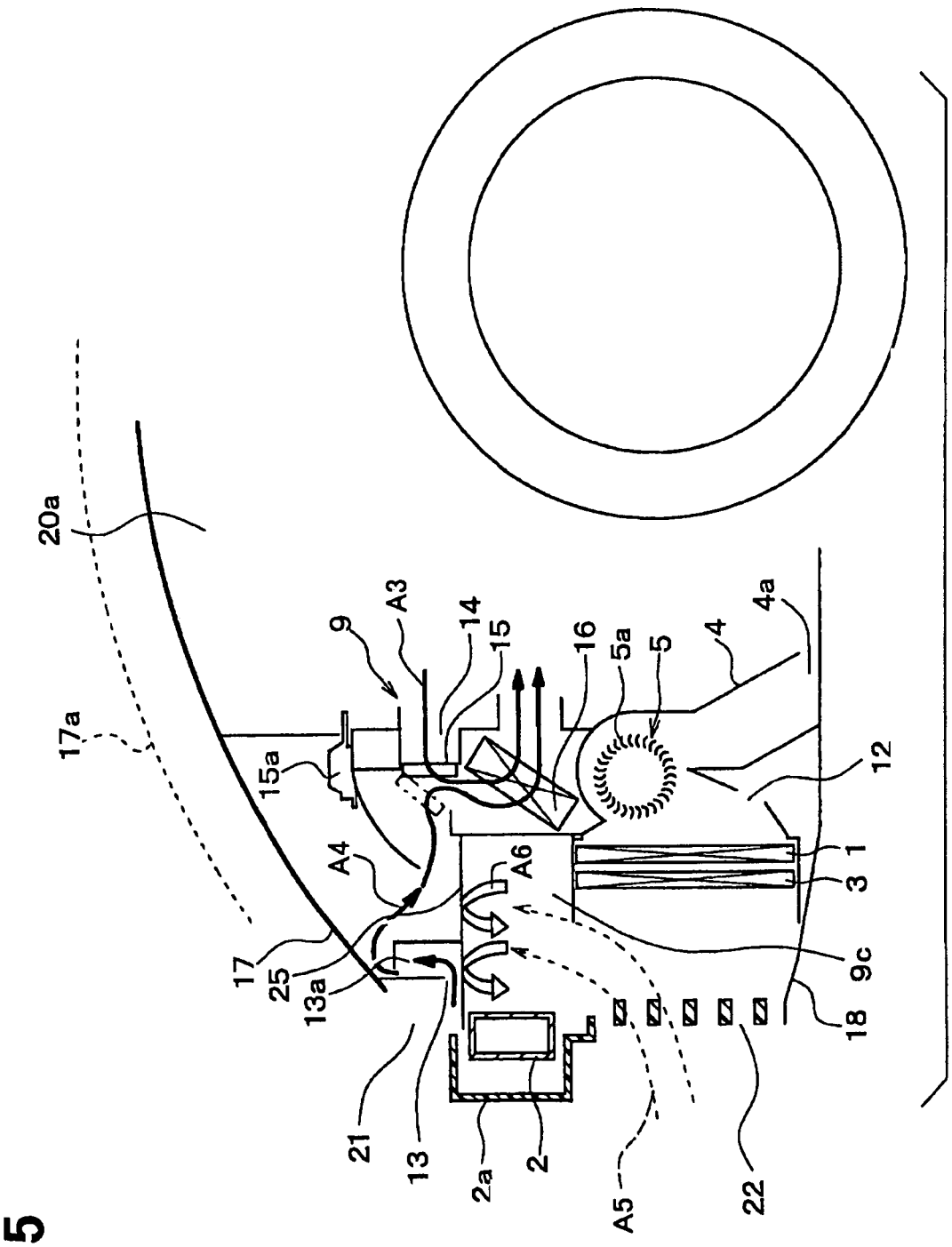
FIG. 5 is a cross-sectional view of a section V of the vehicle front end shown in FIG. 3.

Further, the front end panel 9 forms a bumper reinforcement member receiving portion 9c on its front face, at a position opposite to the bumper reinforcement member 2, as shown in FIGS. 2, 4, and 5. The bumper reinforcement member receiving portion 9c is in a form of recess recessing from the front face of the front end panel 9 toward the rear side of the vehicle. As shown in FIG. 2, the bumper reinforcement member 2 is arranged in front of a front-most face of the front end panel 9 at a predetermined distance and is not located in the bumper reinforcement member receiving portion 9c. In FIG. 2, a dashed line 200 shows a position of the bumper reinforcement member 2 when it is deformed to the rear side when the front side of the vehicle lightly collides.

As shown in FIG. 5, the front end panel 9 has a partition wall 25 between the second cooling air intake passage 13 and the bumper reinforcement member receiving portion 9c. The separation wall 25 restricts rainwater and the like, which has passed through the second air intake part 22, from entering the second cooling air intake passage 13.

A duct portion 9d, shown in FIGS. 1 and 2, is provided to introduce the cooling air toward a heating devices such as an alternator and a battery mounted in the engine compartment 20a.

Next, advantageous effects of the embodiment will be described.

Since the radiator 1 and the condenser 3 are arranged such that the top ends of the radiator 1 and the condenser 3 are located lower than the bottom end of the bumper reinforcement member 2, the position of the engine hood 17, shown by a solid line in FIG. 5, is lower than a conventional position shown by a dashed line 17a. Accordingly, a designing flexibility around the engine hood 17, such as a position and shape, is improved. For example, it is easy to design a slant-nosed engine hood.

Further, the mounting position of the radiator 1 and the condenser 3 are lowered. With this, because the center of gravity of the vehicle is lowered, traveling stability of the vehicle is improved. Furthermore, even when the bumper reinforcement member 2 is deformed toward the rear side in the case of frontal crush, it is less likely that the bumper reinforcement member 2 will strike the radiator 1 and the condenser 3. In addition, the electric auxiliary devices such as the radar 6, the electronic control units 7, 8 and the air cleaner 16 are arranged at the position higher than the radiator 1 and the condenser 3 and at the position either higher than the bumper reinforcement member 2 or at the rear of the bumper reinforcement member 2. Namely, the auxiliary devices 6, 7, 8, 16 are arranged at the position separate from the bumper reinforcement member 2 at the rear of the bumper reinforcement member 2, as compared with the conventional position.

The bumper reinforcement member 9c is formed in the front end panel 9, at a position corresponding to the rear side of the bumper reinforcement member 2. Even if the bumper reinforcement member 2 is largely deformed to the rear side in the case of the frontal crush, the rearward movement of the bumper reinforcement member 2 is received within the bumper reinforcement member receiving portion 9c. Therefore, it is less likely that the bumper reinforcement member 2 will strike the auxiliary devices 6, 7, 8, 16 mounted at the vehicle front side. Furthermore, the damage to the auxiliary devices 6, 7, 8, 16 due to the frontal crush is reduced.

The auxiliary devices 6, 7, 8 are arranged in the second air duct 10 and cooled by the air that is introduced from the first and second intake air ports 21, 22. That is, the auxiliary devices 6, 7, 8 are cooled by the air bypassing the radiator 1 and the condenser 3. Therefore, the auxiliary devices 6, 7, 8 can be efficiently cooled by low temperature outside air.

The first cooling air intake passage 11 forms the labyrinthine structure portion 11a. Therefore, it is less likely that water such as the rainwater passed through the first cooling air intake passage 11 will flow toward the electric auxiliary devices. With this, because the water proof processing of the electric auxiliary devices is simplified and a complicated sealing structure is not required, the manufacturing costs is reduced.

While the vehicle is traveling, contaminants or materials in the outside air such as water or snow may upwardly enter the bumper reinforcement member receiving portion 9c as denoted by arrow A5 in FIG. 5. Such materials may strike and blocked by the separation wall 25, which forms an upper wall of the bumper reinforcement member receiving portion 9c, as denoted by arrow A6. Therefore, the materials is restricted from entering and mixing with the engine intake air.

The radiator 1, the condenser 3 and the auxiliary devices 6, 7, 8, 16, are integrated with the front end panel 9 into the module structure body. This module structure body is mounted to the vehicle body through the front end panel 9. Accordingly, the radiator 1, the condenser 3 and the auxiliary devices 6, 7, 8, 16 are fixed to the vehicle body by fixing the front end panel 9 to the vehicle body. Therefore, the number of assembling steps of the vehicle is reduced.

Second Embodiment

Figure 6:
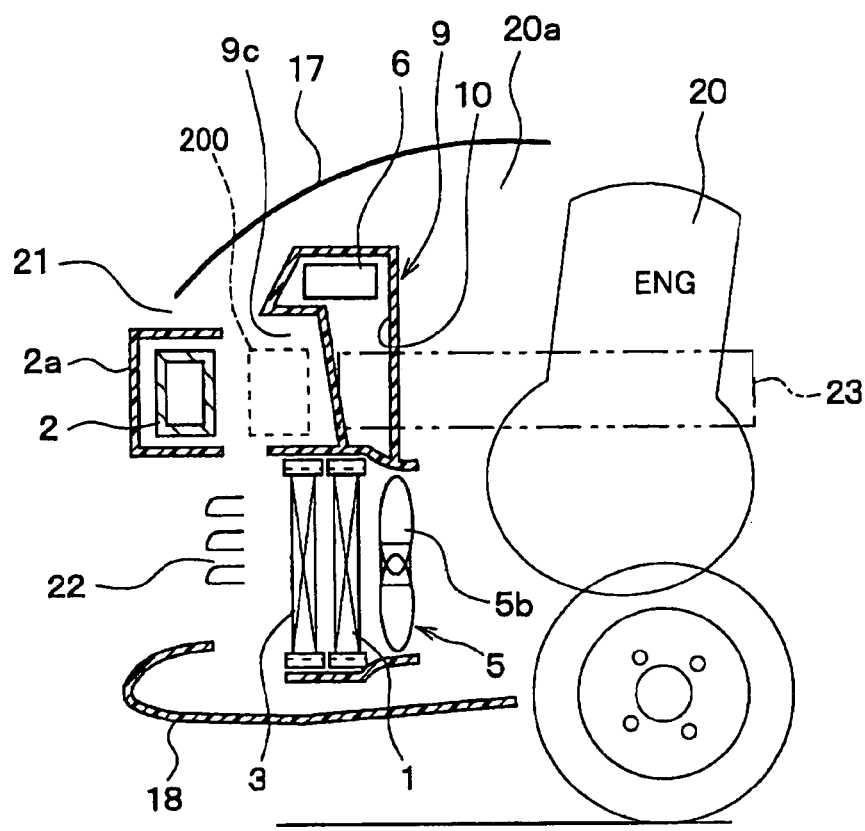
FIG. 6 is a cross-sectional view of a vehicle front end structure according to a second embodiment of the present invention.

In the second embodiment, an axial flow fan 5b is used in place of the transverse fan 5a of the first embodiment, as shown in FIG. 6. Also in this case, advantages similar to the first embodiment are provided.

Third Embodiment

Figure 7:
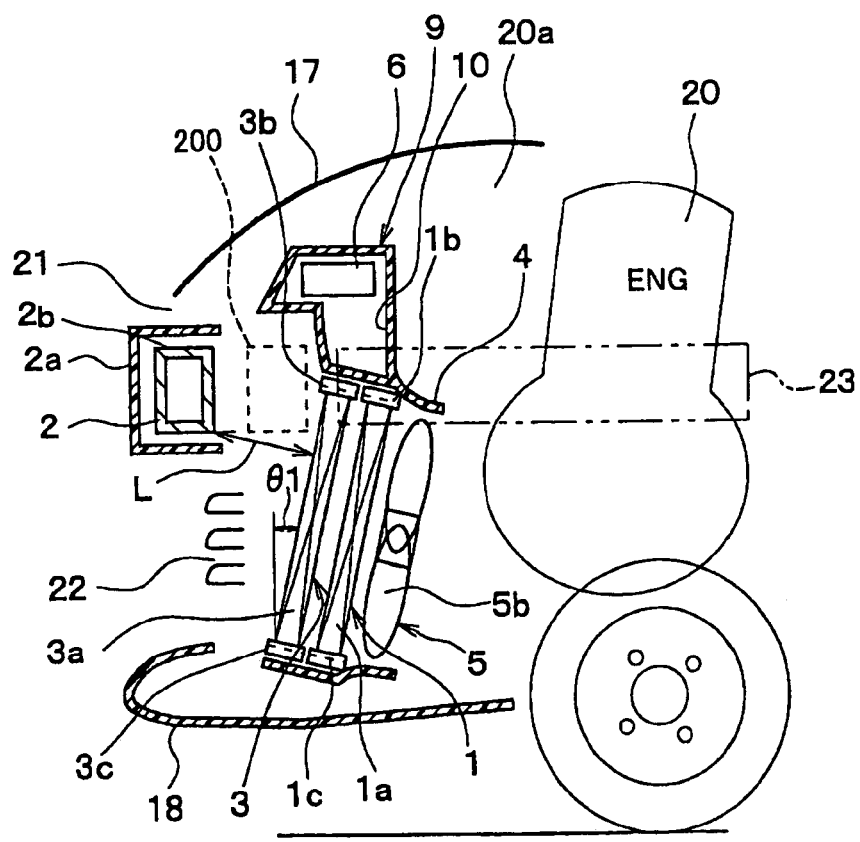
FIG. 7 is a cross-sectional view of a vehicle front end structure according to a third embodiment of the present invention.

In the first and second embodiments, the radiator 1 and the condenser 3 are arranged completely lower than the bumper reinforcement member 2. In the third embodiment, as shown in FIG. 7, the radiator 1 and the condenser 3 are arranged at a position lower than the top wall 2b of the bumper reinforcement member 2. Furthermore, the radiator 1 and the condenser 3 are inclined such that the top ends are located more to the rear side of the vehicle than the bottom ends, with respect to the vehicle front and rear direction. As shown in FIG. 7, core surfaces 1a, 3a of the radiator 1 and the condenser 3 define an angle of inclination $\theta 1$ with, respect to a vertical direction.

In the third embodiment, the upper portions of the radiator 1 and the condenser 3 are partly located behind the bumper reinforcement member 2. However, since the radiator 1 and the condenser 3 are arranged in the inclined position toward the rear side, the heat radiating performance of the radiator 1 and the condenser 3 is maintained.

Figure 8:
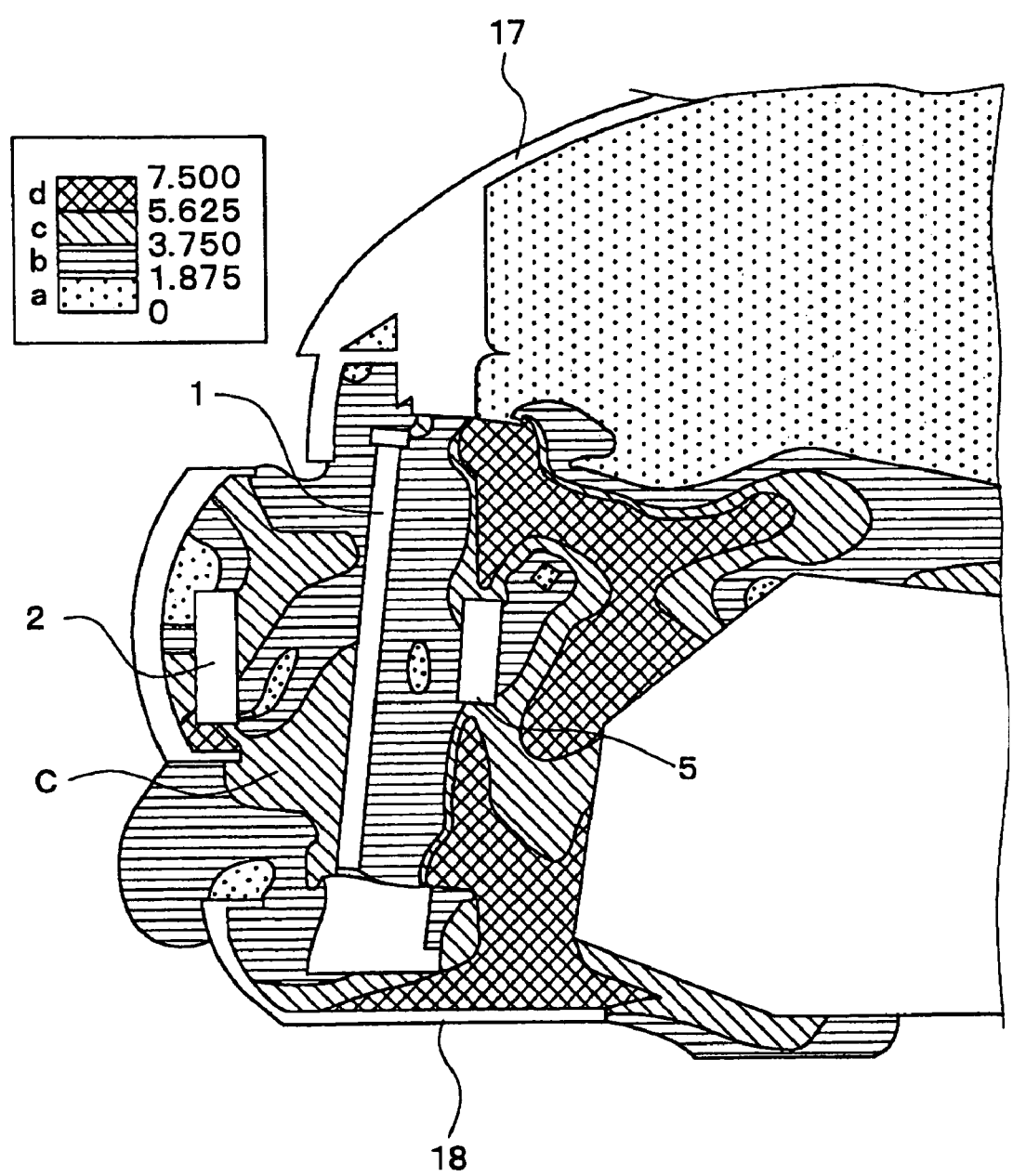
FIG. 8 is a view showing air velocity distribution at a vehicle front end according to the third embodiment of the present invention.

A distribution of air flow velocity around the radiator 1 when the radiator 1 is inclined to the rear side is shown in FIG. 8. A high velocity area c in which the air flow velocity is in a range between 3.750 m/s and 5.625 m/s exists at the rear of and diagonally above the bumper reinforcement member 2.

Therefore, even when the radiator 1 and the condenser 3 are arranged such that the upper portions are partly located behind the bumper reinforcement member 2, the air having high velocity can be supplied to the core portions 1a, 3a of the radiator 1 and the condenser 3 by inclining the radiator 1 and the condenser 3 to the rear side. Thus, the heat radiating performance of the radiator 1 and the condenser 3 is maintained. If the radiator 1 and the condenser 3 are arranged in the upright position, a ratio of the high velocity area c corresponding to the core portions 1a, 3a is reduced, in comparison with the case that the radiator 1 and the condenser 3 are arranged in the inclined position. In this case, therefore, the heat radiating performance of the radiator 1 and the condenser 3 is reduced.

According to the test result, it is preferable that the angle $\theta 1$ of inclination is in a range from 0 degrees to equal to or less than 40 degrees, to maintain the heat radiating performance. More preferably the angle $\theta 1$ of inclination is in a range between equal to or greater than 5 degrees and equal to or less than 30 degrees.

An increase in the angle $\theta 1$ of inclination results in an increase in the spaces for mounting the radiator 1 and the condenser 3 with respect to the vehicle front and rear direction. Therefore, it is preferable to set the angle $\theta 1$ of inclination equal to or less than 40 degrees also in view of saving the mounting space.

Further, it is preferable that a minimum distance L shown in FIG. 7 between the condenser 3 and the bumper reinforcement member 2 is equal to or greater than 60 mm, more preferably greater than 90 mm, to maintain the heat radiating performance. Here, the minimum distance L is measured in a direction parallel to the normal with respect to the front face of the core portion 3a of the condenser 3.

In the third embodiment, since the radiator 1 and the condenser 3 are inclined rearward, the distance between the upper portions of the condenser 3 and the bumper reinforcement member 2 is increased. Therefore, even if the bumper reinforcement member 2 is moved rearward to the position shown by the dashed line 200 due to the frontal crush, it is less likely that the bumper reinforcement member 2 will strike the condenser 3 and the radiator 1. Therefore, the damage to the radiator 1 and the condenser 3 is reduced.

The radiator 1 is a cross flow-type radiator in which the cooling water flows in a horizontal direction, as shown in FIG. 7. Therefore, in the core portion 1a of the radiator 1, flat tubes through which the cooling water flows are arranged to extend in the horizontal direction and layered in the vertical direction. Further, corrugated fins are interposed between the tubes such that the corrugated fins and the tubes are alternately layered. An inlet tank for distributing the cooling water to the tubes is connected to the ends of the tubes at one side. An outlet tank for collecting the cooling water passed through the tubes is connected to the opposite end of the tubes. Furthermore, at the top and bottom ends of the core portion 1a, side plates 1b, 1c are connected. The side plates 1b, 1c are provided to reinforce the core portion 1a.

Similar to the radiator 1, in the core portion 3a of the condenser 3, flat tubes through which the refrigerant flows are arranged in the horizontal direction. The tubes and corrugated fins are alternately layered. Further, an inlet tank is connected to the ends of the tubes on one side to distribute the refrigerant to the tubes and an outlet tank is connected to the opposite ends of the tubes to collect the refrigerant therein. Furthermore, side plates 3b, 3c are connected to the top and bottom ends of the core portion 3a of the condenser 3. The side plates 3b, 3c are provided to reinforce the core portion 3a.

In this third embodiment, the radiator 1 and the condenser 3 are arranged lower than the top wall 2b of the bumper reinforcement member 2. This means that the top end of the core portions 1a, 3a of the radiator 1 and the condenser 3 are at least lower than the top wall 2b of the bumper reinforcement member 2. It is acceptable that the upper side plates 1b, 3b are located at a position higher than the top wall 2b of the bumper reinforcement member 2.

In the first embodiment and the second embodiment, the detailed structures of the radiator 1 and the condenser 3 are not described. However, the radiator 1 and the condenser 3 of the first and second embodiments have structures similar to those of the third embodiment shown in FIG. 7.

Fourth Embodiment

Figure 9:
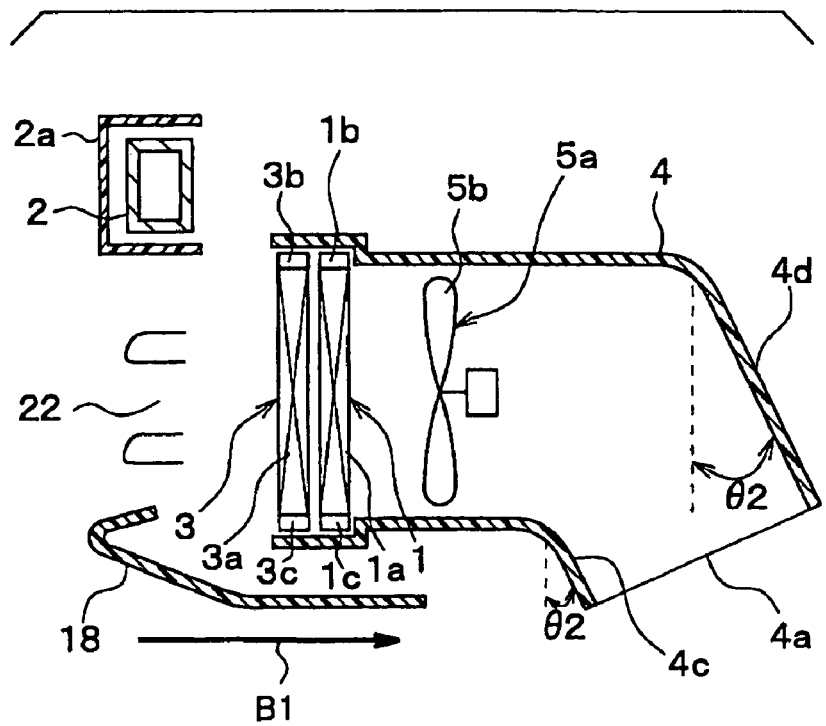
FIG. 9 is a cross-sectional view of a part of a vehicle front end according to a fourth embodiment of the present invention.

The air discharge port 4a is formed at the lower end of the first air duct 4 and its opening direction is inclined to the rear side of the vehicle with respect to the vertical direction. In the fourth embodiment, further, an angle of inclination of the opening direction of the air discharge port 4a is set within a predetermined range. Here, as shown in FIG. 9, the front wall 4c and the rear wall 4d of the air discharge port 4a are inclined at an angle $\theta 2$ with respect to the vertical direction.

Figure 10:
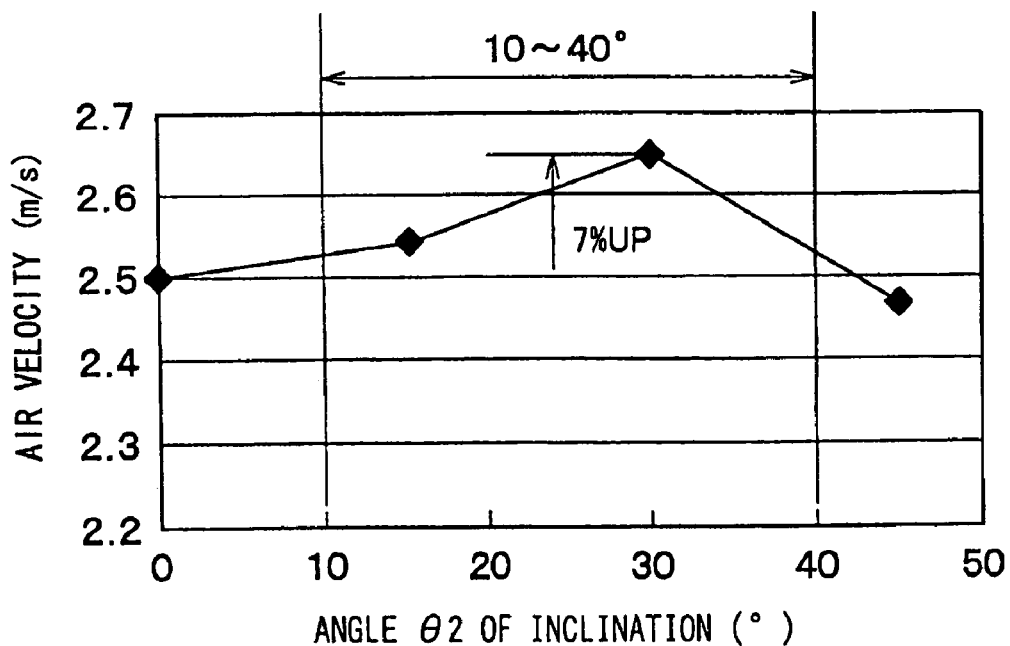
FIG. 10 is a graph showing a relationship between an angle $\theta 2$ of inclination of an air discharge port and velocity of air passing through a heat exchanger according to the fourth embodiment of the present invention.

FIG. 10 shows a test result of the change of velocity of air passing through the radiator 1 and the condenser 3 according to the change of the angle $\theta 2$ of inclination. Here, the vehicle speed is 35 km/h.

As shown in FIG. 10, when the angle $\theta 2$ is within a range between 10 degrees and 40 degrees, the flow velocity is high. Especially, when the angle $\theta 2$ is approximately 30 degrees, the flow velocity is improved by approximately 7%, as compared with the case when the angle $\theta 2$ is set outside of the above range.

When the angle $\theta 2$ of inclination of the air discharging port 4a is set in the predetermined range, the flow velocity of air passing through the radiator 1 and the condenser 3 are improved by an air suction effect (Venturi effect) created by an air flow B1 produced under the under cover 18 while the vehicle traveling. Accordingly, the performance of the radiator 1 and the condenser 3 are improved.

Fifth Embodiment

Figure 11:
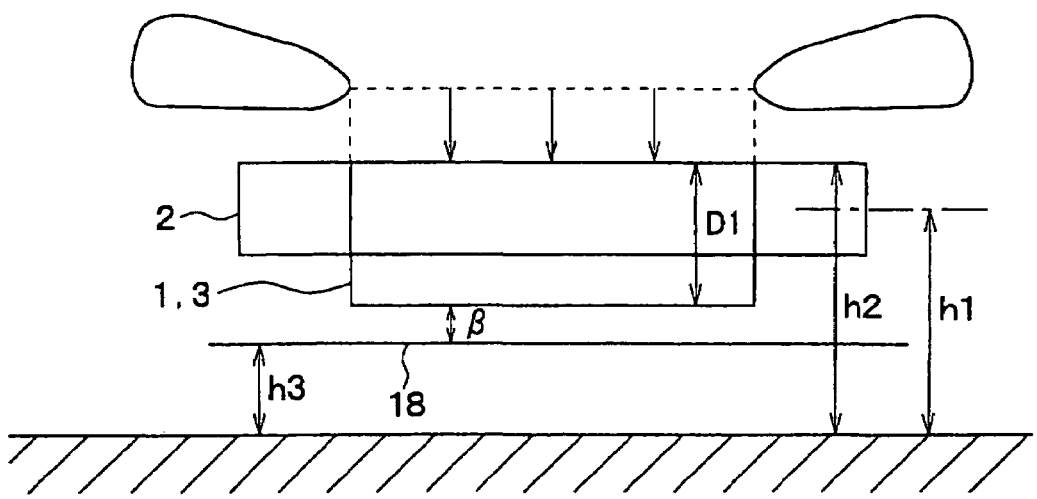
FIG. 11 is a schematic explanatory view of a vehicle front end according to a fifth embodiment of the present invention.

The fifth embodiment relates to a vertical dimension D1 of the radiator 1 and the condenser 3. The radiator 1 and the condenser 3 are arranged as shown in FIG. 11, when viewed from the front side of the vehicle. A height h1 of a central point of the bumper reinforcement member 2 is regulated substantially 450±50 mm from the ground. Based on this, a height h2 of the top wall 2b of the bumper reinforcement member 2 is generally 500 mm from the ground at the average.

On the other hand, a height h3 of the under cover 18 is generally 190 mm from the ground at the average. Therefore, when the vertical dimension D1 of the radiator 1 and the condenser 3 is equal to or less than 300 mm, the radiator 1 and the condenser 3 can be arranged at a position between the top wall 2a of the bumper reinforcement member 2 and the under cover 18 with respect to the vertical direction. When the vertical dimension D1 is 300 mm, an extra space β of 10 mm is provided.

Sixth Embodiment

The sixth embodiment relates to the specific structure of the core portions 1a, 3a for maintaining a required heat radiating performance of the radiator 1 and the condenser 3. Hereafter, the description will be mainly made with an example of the radiator 1 with reference to FIGS. 12, 13A and 13B.

Figure 12:
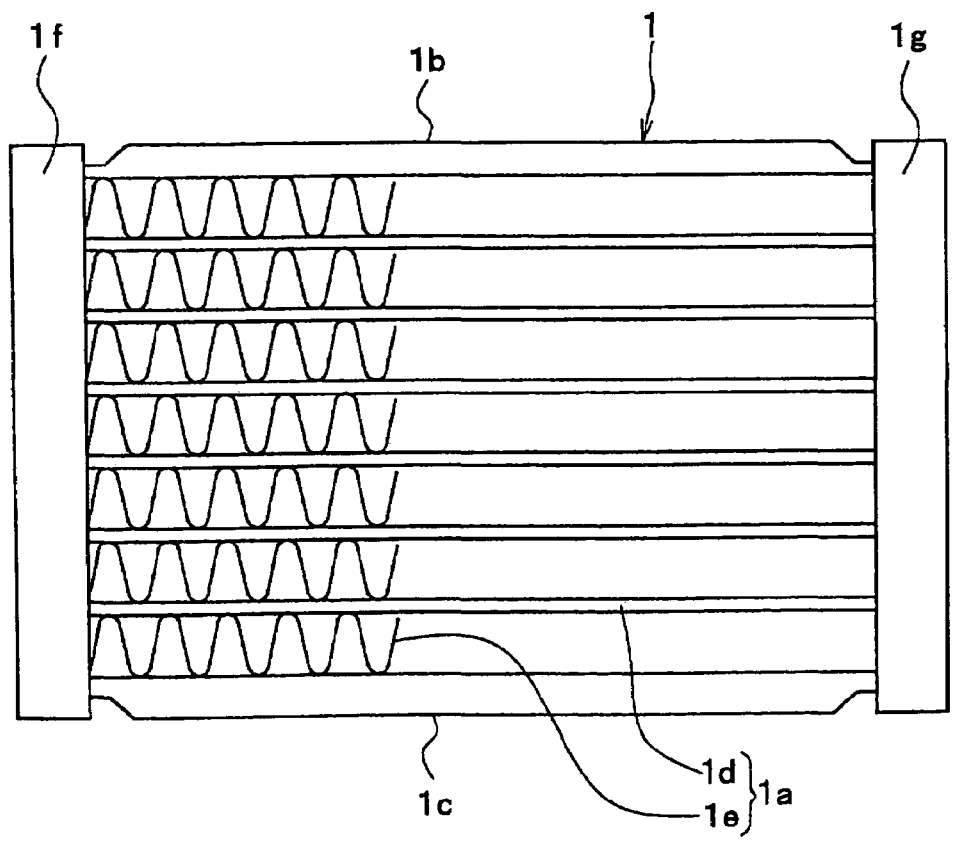
FIG. 12 is a plan view of a radiator according to a sixth embodiment of the present invention.

As shown in FIG. 12, the core portion 1a of the radiator 1 is constructed of the tubes 1d through which the cooling water flows and the corrugated fins 1e. The tubes 1d extend in the horizontal direction. Furthermore, the tubes 1d and the corrugated fins 1e are alternately layered and joined to each other. The fins 1e are provided to increase an area of heat-transfer surface, thereby to facilitate heat exchanging performance between the cooling water and air.

Header tanks 1f, 1g are connected to the longitudinal ends of the tubes 1d. The header tanks 1f, 1g are arranged to extend in the direction perpendicular to the longitudinal direction of the tubes 1d. Therefore, the longitudinal ends of the tubes 1d communicate with each other through the, header tanks 1f, 1g. One of the header tanks 1f, 1g corresponds to the inlet tank described in the third embodiment and the opposite header tank corresponds to the outlet tank. Further, the side plates 1b, 1c are connected to the upper and lower ends of the core portion 1a.

In this embodiment, the tubes 1d, the fins 1e, the header tanks 1f, 1g and side plates 1b, 1c are made of metal, for example, aluminum alloy. These members 1b through 1g are integrated with each other by brazing.

Figure 13A:
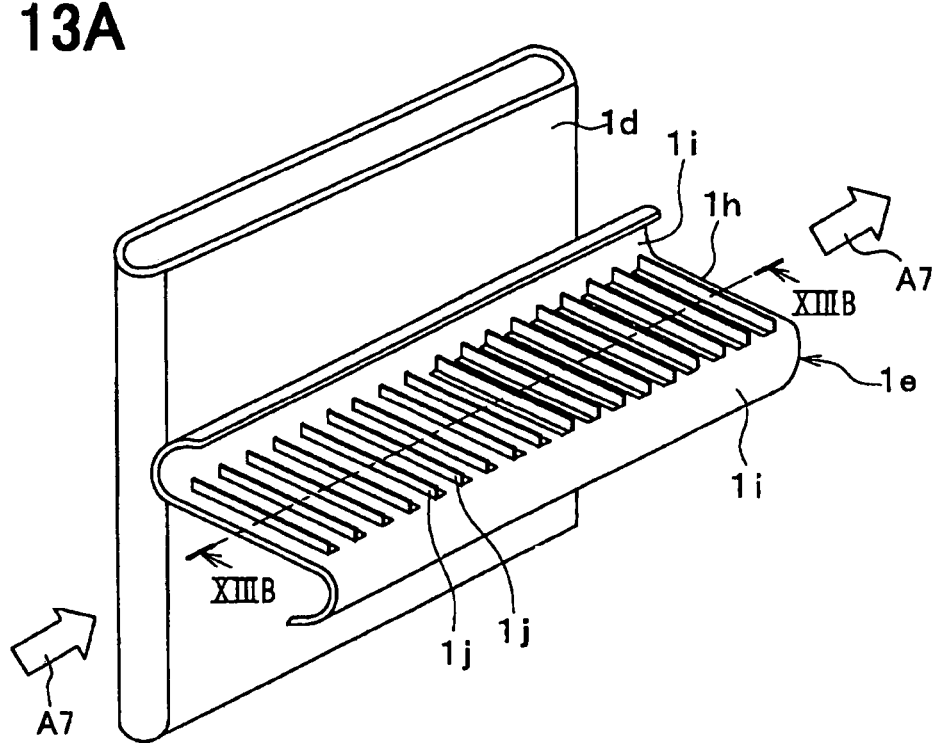
FIG. 13A is a partly enlarged perspective view of a core portion of a radiator according to the sixth embodiment of the present invention.

As shown in FIG. 13A, each tube 1d is flat and defines a passage through which the cooling water flows. The corrugated fin 1e is brazed to the flat surface of the tube 1d. The corrugated fin 1e is corrugated so that adjacent flat portions 1h are connected through curved portions 1i. Further, louvers 1j are formed on the flat portions 1h by cutting and bending the cut sections perpendicular to the flat portions 1h. The air flowing along the flat portions 1h strikes the louvers 1j. A coefficient of heat transfer between the air and the fins 1e is improved by disturbing the air flow by the louvers 1j.

Figure 13B:
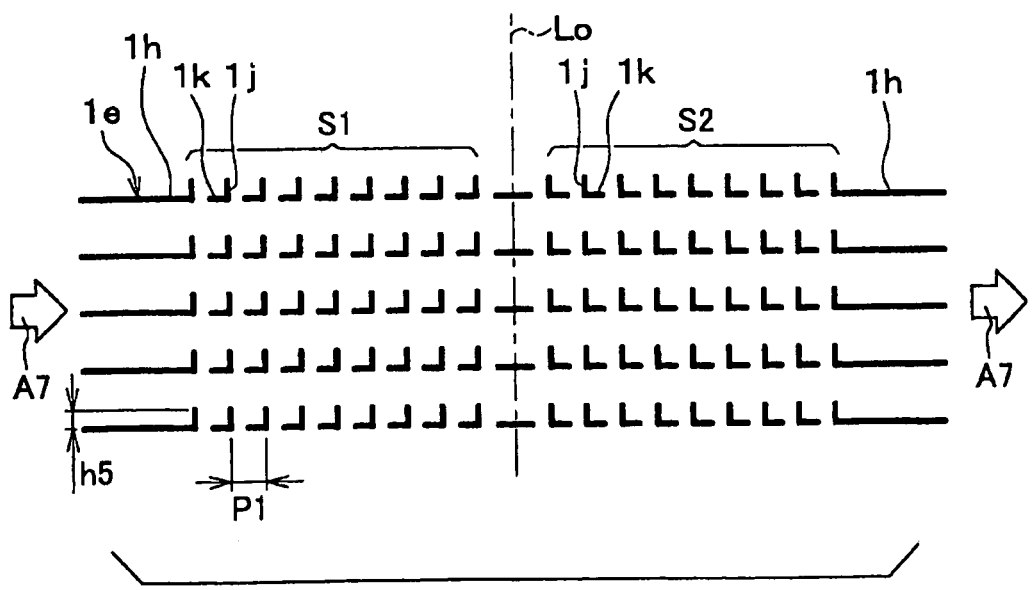
FIG. 13B is a cross-sectional view of fins of the core portion shown in FIG. 13A taken along a line XIIIB-XIIIB.
Figure 14A:
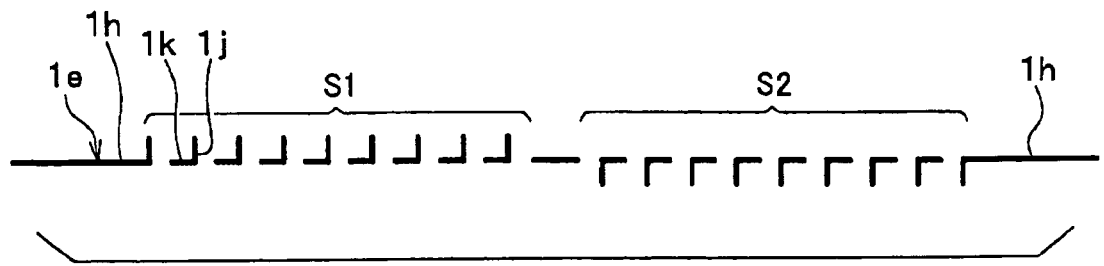
FIG. 14A to 14D are a cross-sectional view of fins showing modifications of fin shape according to the sixth embodiment of the present invention.
Figure 14B:
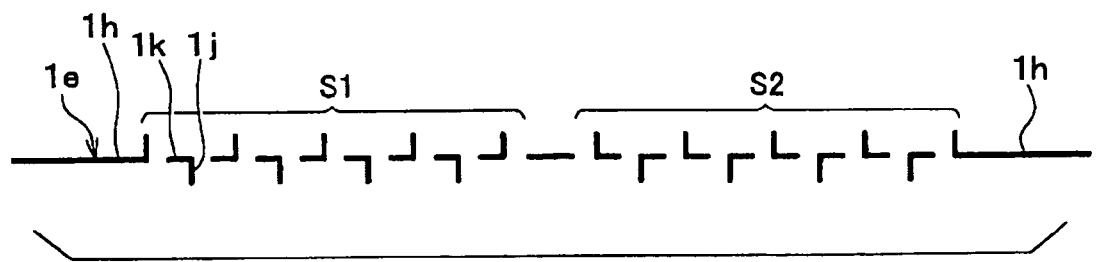
Figure 14C:
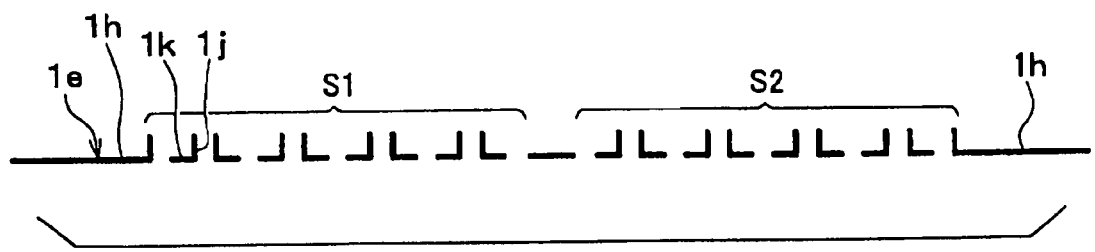
Figure 14D:
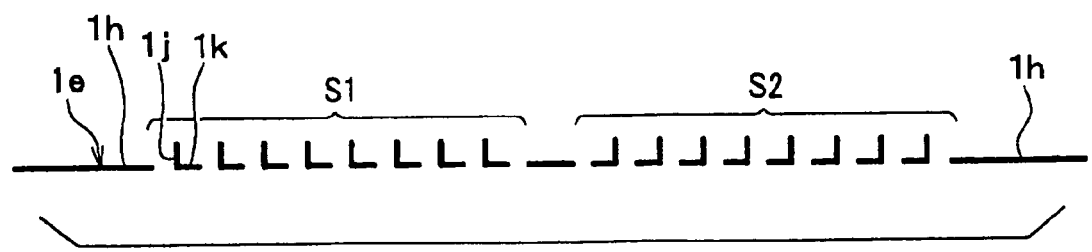

As shown in FIG. 13B, each of the louvers 1j forms a substantially L-shaped cross-section with the adjoining flat portion 1k. Further, the fin 1e has a shape symmetric between a first section S1 upstream from a central position Lo and a second section S2 downstream from the central position Lo with respect to an air flow direction (arrow A7). That is, the direction of L shapes of the louvers 1j in the first section S1 is opposite to that of the louvers 1j in the second section S2 with respect to the central position Lo.

Further, the number of louvers 1j of the first section S1 is the same as the number of louvers 1j of the second section S2. In the first section S1, each louver 1j extends perpendicularly from a downstream edge of each adjoining flat portion 1k. In the second section S2, each louver 1j extends perpendicularly from an upstream edge of each adjoining flat portion 1k.

Furthermore, to improve efficiency of the heat transfer of air in the radiator 1, the fins 1e are preferably designed as follows. A thickness of the fin 1e, that is a thickness of the flat portion 1h, 1k is in a range from 0.01 mm to 0.1 mm. A height h5 of each louver 1j is in a range from 0.1 mm to 0.5 mm. Also, a louver pitch p1 between the adjacent louvers 1j is in a range from one and a half times of the louver's height h5 to five times of the louver's height h5. In the embodiment, for example, the thickness of the fin 1e is 0.05 mm, the louver's height h5 is 0.2 mm and the louver's pitch p1 is 0.5 mm, that is, two and a half times of the louver's height h5.

By the above fine design of the louvers 1j and the disturbance of air, the growth of temperature border on the surfaces of the corrugated fins 1e is reduced. Therefore, the coefficient of heat transfer of air is largely improved in the radiator 1.

Further, the shape and configuration of the louvers 1j is not limited to those shown in FIG. 13B. The shape and configuration of the louvers 1j can be modified in variable ways, as shown in FIGS. 14A to 14D, for example.

The condenser 3 has a structure similar to the radiator 1. The above louvers shapes of the corrugated fins 1e can be employed to corrugated fins of the condenser 3. Also in the condenser 3, the coefficient of heat transfer is largely improved.

Figure 15:
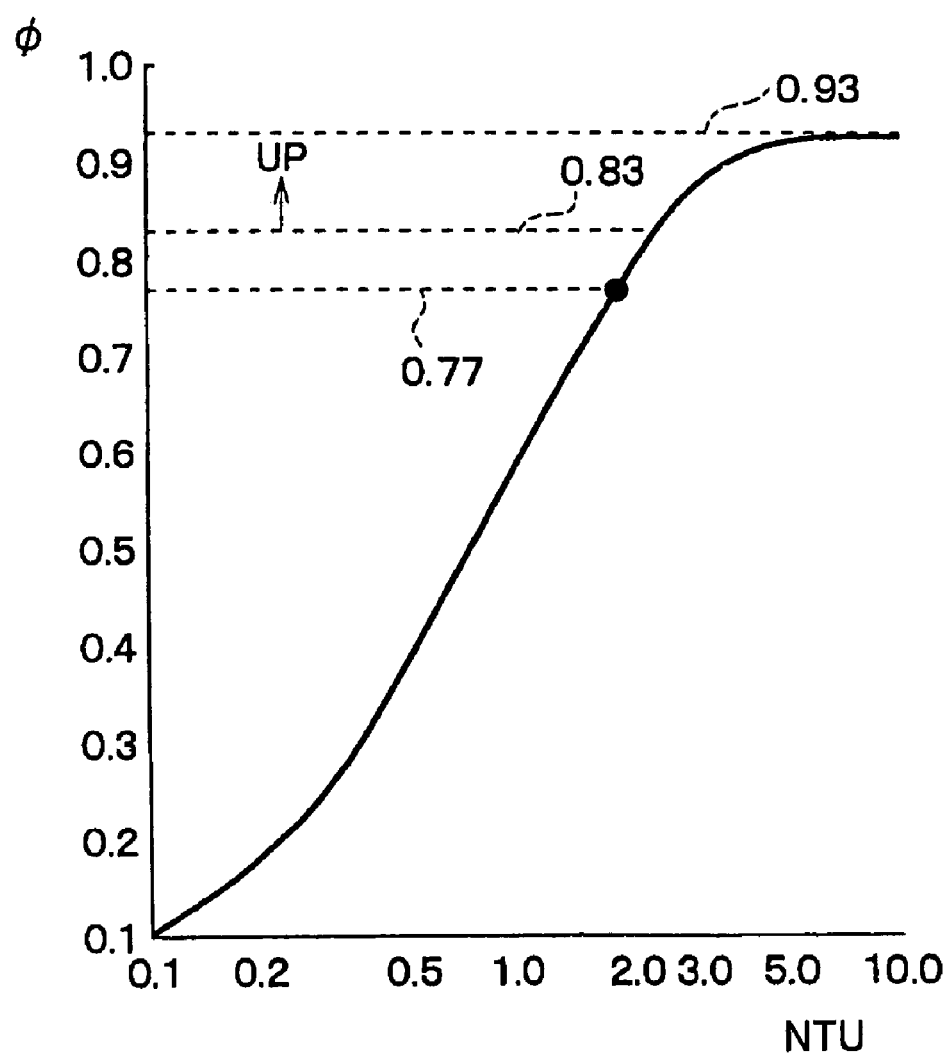
FIG. 15 is a graph showing a temperature efficiency of the radiator according to the sixth embodiment of the present invention.
Figure 16:
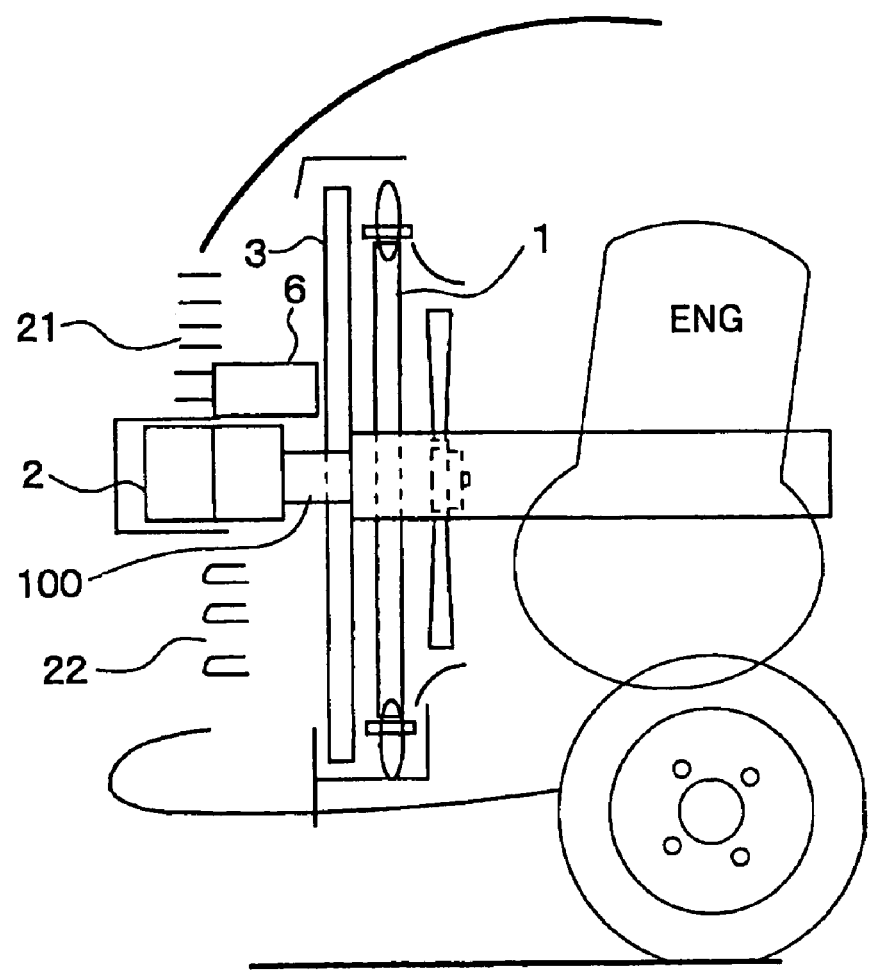
FIG. 16 is a schematic cross-sectional view of a vehicle front end of a related art.
Figure 17:
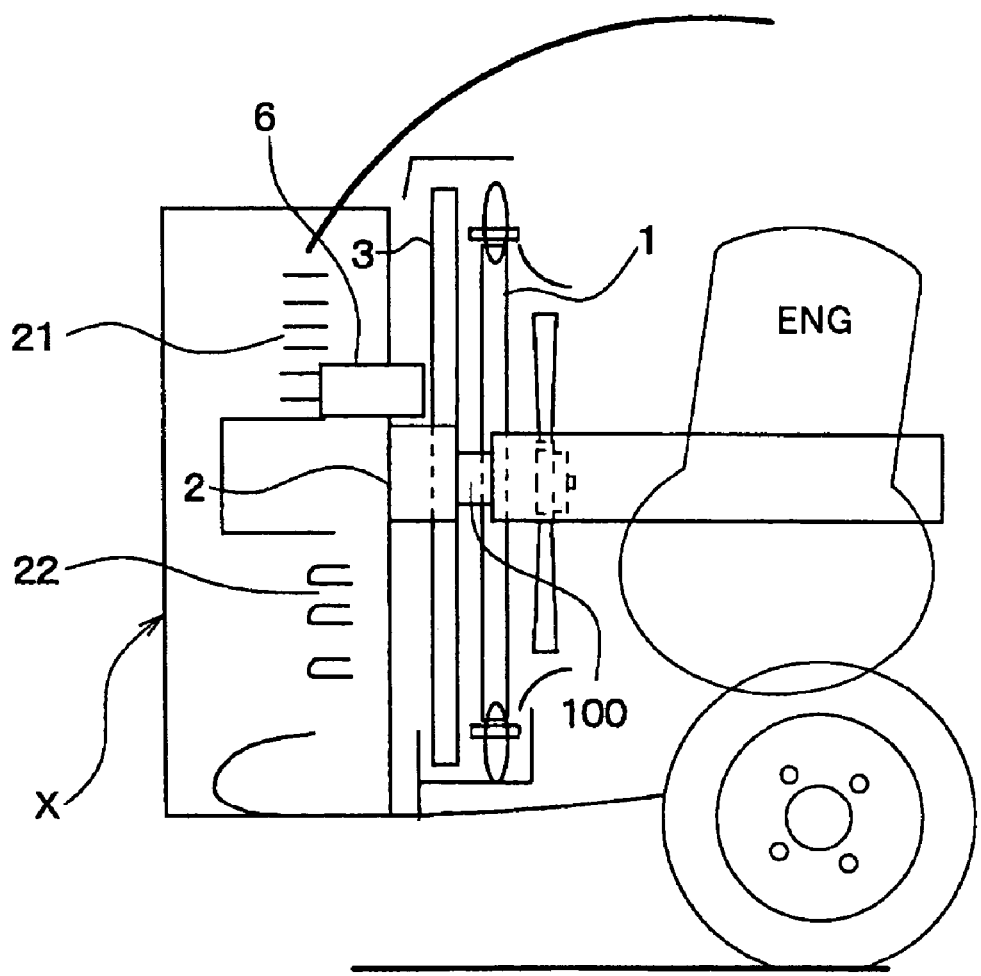
FIG. 17 is a schematic cross-sectional view of a vehicle front end, in a case of frontal crush, of a related art.

FIG. 15 shows a relationship between a temperature efficiency φ in the core portion 1a of the radiator 1 and the number of heat transfer unit NTU. The temperature efficiency φ is calculated based on a following equation (1) as well known.

$$\phi = (Twi - Two)/(Twi - Tai) \quad (1)$$

Here, Twi represents a temperature of the cooling water at an inlet of the radiator 1. Two represents a temperature of the cooling water at the outlet of the radiator 1. Tai represents a temperature of air introduced in the radiator 1.

The temperature efficiency φ is affected by the flow velocity of air passing through the radiator 1. Therefore, as a measuring condition of the temperature efficiency φ, the flow velocity of air passing through the radiator 1 is set to a predetermined range from 1 m/s to 5 m/s. In FIG. 15, the flow velocity of air passing through the radiator 1 is 2.5 m/s.

The number of heat transfer unit NTU is a dimensionless number and is calculated based on a following equation (2) as well known.

$$NTU = \alpha a \cdot Fa/Wa \quad (2)$$

Here, α a represents a coefficient of heat transfer of air. Fa represents an area of heat transfer of air. Wa represents a flow rate of air.

As shown in FIG. 15, the radiator 1 of the embodiments other than the sixth embodiment has a temperature efficiency of 0.77. In the sixth embodiment, the coefficient of heat transfer of air α a is largely improved by the louvers 1j of the fins 1e. Therefore, the temperature efficiency φ is increased from 0.77 to a value equal to or greater than 0.83. In the radiator 1, a theoretical limit of the temperature efficiency is 0.93.

Also in the radiator 3 having the louvers' shape similar to the louvers 1j of the radiator 1, the temperature efficiency φ is increased from 0.77 to the value equal to or greater than 0.83.

Other Embodiments

In the above embodiments, the first and second air intake parts 21, 22 are formed on the both upper and lower sides of the bumper reinforcement member 2. However, it is not always necessary to form the first air intake part 21. It is possible to form only the second air intake part 22 under the bumper reinforcement member 2.

In the above embodiments, the radiator 1 and the condenser 3 are provided at the front end of the vehicle as the heat exchangers for radiating heat. However, the present invention can be employed to the front end structure without having the condenser 3.

In the above embodiments, the radar 6, electronic control units 7, 8 and air cleaner 16 are included in the auxiliary devices mounted at the front part of the vehicle. However, the auxiliary devices are not limited to the above devices. The auxiliary devices for example includes a reserve tank and a washer tank. Those devices can be integrated with the front end panel 9 and included in the front end module.

The material of the front end panel 9 is not limited to resin. The front end panel 9 can be made of a metal material such as magnesium or aluminum.

In the above embodiments, the first air duct 4 and the second air duct 10 are integrally formed into the front end panel 9. However, the present invention is not limited to the above. For example, the first air duct 4 and the second air duct 10 can be formed as separate parts. The first air duct 4 and the second air duct 10 can be fixed to the front end panel 9.

The present invention is not limited to the above embodiments, but may be implemented in other ways without departing from the spirit of the invention.

What is claimed is:

1. A front end structure of a vehicle, comprising:
a bumper reinforcement member disposed at a front end of the vehicle, the bumper reinforcement member being in a form of beam extending in a vehicle left and right direction;
an air intake part defining an opening under the bumper reinforcement member;
a heat exchanger having a core portion for performing heat exchange by receiving air introduced from the opening, the heat exchanger being disposed at a rear of the bumper reinforcement member with respect to a vehicle front and left direction such that a top end of the core portion is located at a position lower than a top end of the bumper reinforcement member;
a blower unit located at a rear of the heat exchanger for causing the air introduced from the opening to pass through the core portion;
a duct member defining an air passage through which air flows, the duct member being disposed such that a downstream end with respect to the air flow communicates with an inlet of the blower unit; and
an auxiliary device disposed in the air passage of the duct member.

2. The front end structure according to claim 1 further comprising:
a water restricting part disposed at a position upstream of the auxiliary device in the air passage, wherein
the water restricting part forms a labyrinthine structure, and
the auxiliary device includes an electric part.

3. The front end structure according to claim 1 further comprising:
a water restricting part disposed at a position upstream of the auxiliary device in the air passage, wherein
the water restricting part forms a labyrinthine structure, and
the auxiliary device is an air cleaner.

4. The front end structure according to claim 1, wherein
the air intake part further defining a second opening above the bumper reinforcement member, and
the duct member is disposed such that an upstream end with respect to the air flow communicates with the second opening so that the auxiliary device is cooled by the air that is introduced from the second air intake opening and bypasses the heat exchanger.

5. The front end structure according to claim 1, wherein
the air intake part further defining a second opening above the bumper reinforcement member,
the duct member is disposed such that the air introduced from the first opening and the second opening flows therein.

6. The front end structure according to claim 1, further comprising:
an air discharge duct disposed at an outlet of the blower unit, wherein
the air discharge duct has an end forming an air discharge port through which air is discharged, and
the end is inclined toward a rear side of the vehicle with respect to a vertical direction.

7. The front end structure according to claim 6, wherein the end of the air discharge duct is inclined such that an angle of inclination with respect to the vertical direction is in a range between equal to or greater than 10 degrees and equal to or less than 40 degrees.

8. The front end structure according to claim 1, wherein the auxiliary device is arranged at a position higher than the heat exchanger.

9. The front end structure according to claim 1, further comprising:
a front end panel fixed to a body of a vehicle, wherein the heat exchanger and the auxiliary device are integrated with the front end panel and mounted to the vehicle through the front end panel.

10. The front end structure according to claim 1, wherein the heat exchanger is disposed such that a top end of the heat exchanger is located at a position lower than a bottom end of the bumper reinforcement member.

* * * * *